United States Patent

[11] 3,571,903

[72] Inventor Eric H. Persson
Rochester, Minn.
[21] Appl. No. 783,534
[22] Filed Dec. 13, 1968
[45] Patented Mar. 23, 1971
[73] Assignee International Business Machines
Corporation
Armonk, N.Y.

[54] METHOD OF SECURING A SELF-PIERCING AND CLINCHING ELEMENT TO A SHEET OF METAL
3 Claims, 13 Drawing Figs.

[52] U.S. Cl. .................................................. 29/432.1,
29/520, 287/20.3
[51] Int. Cl. ............................................... B23p 11/00
[50] Field of Search .......................................... 29/432,
432.1, 520; 151/41.73; 287/20.3

[56] References Cited
UNITED STATES PATENTS

| | | | |
|---|---|---|---|
| 2,372,485 | 3/1945 | Griffin | 29/520X |
| 2,691,818 | 10/1954 | Rockwell | 29/432 |
| 2,799,188 | 7/1957 | Newcomb | 29/432X |
| 3,186,284 | 6/1965 | Bennett | (29/432UX) |
| 3,276,499 | 10/1966 | Reusser | 29/432X |
| 3,334,406 | 8/1967 | Bennett | (29/432UX) |
| 3,443,617 | 5/1969 | Whiteside et al. | 29/432X |

FOREIGN PATENTS

| 955,813 | 4/1964 | Great Britain | 29/432 |
|---|---|---|---|

Primary Examiner—Charlie T. Moon
Attorneys—Robert W. Lahtinen and Hanifin and Jancin ABSTRACT: The invention pertains to a method and apparatus for securing a member to sheet material. The member is formed of material of equal or greater hardness than the sheet to which it is to be attached and in a single operation with a cooperating die is pressed against the sheet stock form its own aperture and deform the material of the sheet adjoining the member to positively secure member and sheet stock together. In an alternative embodiment the member is received in a prepared recess of a workpiece of hard material to effect attachment through a broaching action of the member with respect to the workpiece material.

PATENTED MAR 23 1971
3,571,903
SHEET 1 OF 2
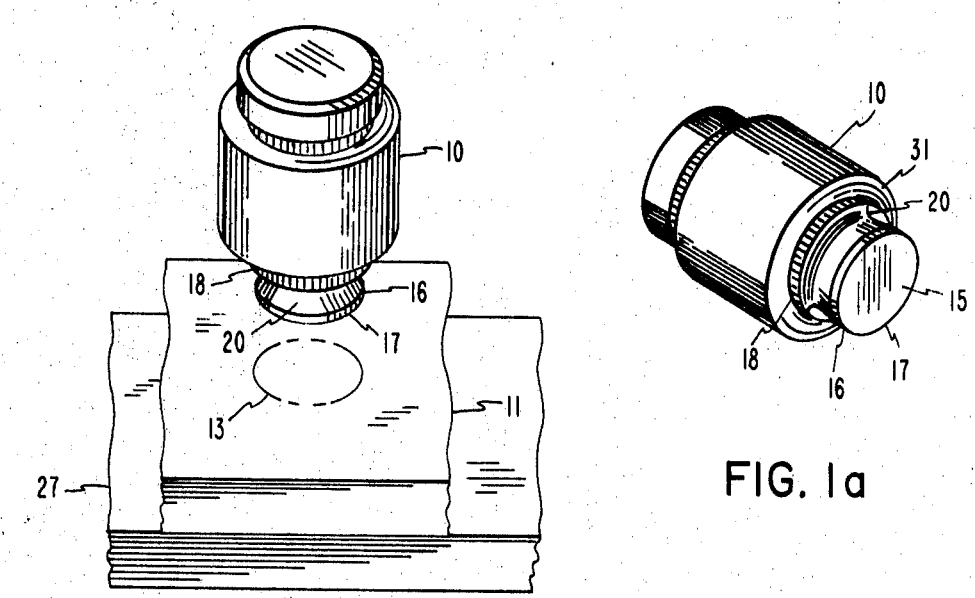
FIG. 1  
FIG. 1a
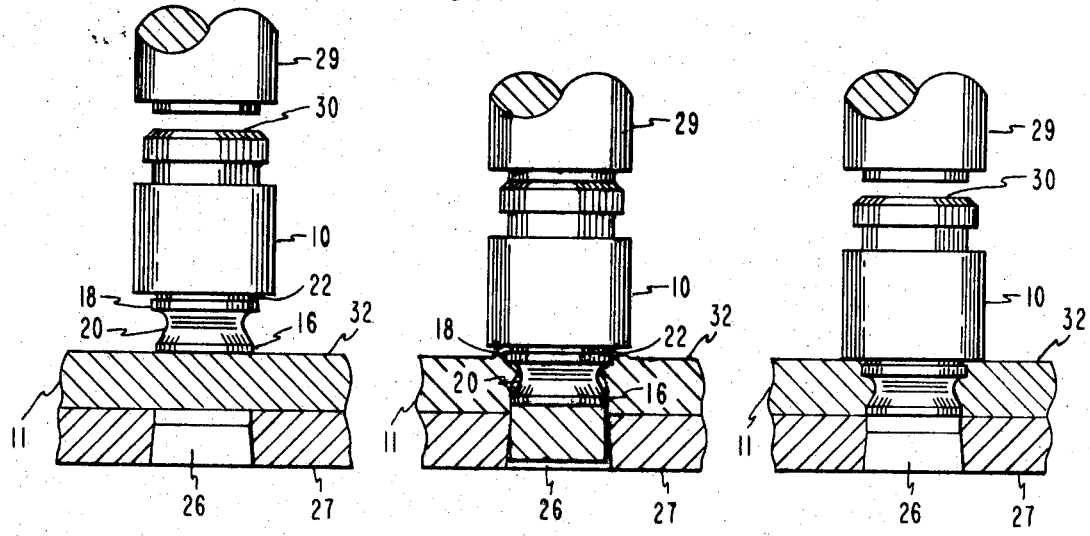
FIG. 2a  FIG. 2b  FIG. 2c
INVENTOR.  
ERIC H. PERSSON  
BY  
ATTORNEY

METHOD OF SECURING A SELF-PIERCING AND CLINCHING ELEMENT TO A SHEET OF METAL

BACKGROUND OF THE INVENTION

In present practice attachment of studs, bearings, and similar articles to sheet materials is accomplished by many methods, such as hot upsetting, ring or projection welding or swagging a member in a prepared aperture. While these methods have been found sufficiently satisfactory to obtain broad usage, each possesses attributes it would be desirable to avoid. The use of the prepared aperture requires that separate operations occur for the preparation of the aperture and the assembly of a part thereto with each of the operations demanding a precision orientation between the tool or part and the sheet stock to which the attachment is to be made. Further, the use of either welding or hot upsetting to secure the part is likely to disturb the correct location of the finally secured member. Where an element or a plurality of elements is secured in an aperture or apertures by upsetting material from the sheet, there still exists the problem of multiple operations during each of which alignment is a factor.

SUMMARY OF THE INVENTION

In the assembly method of the present invention, the member being secured is used as a punch to prepare the aperture for mounting the member to the sheet stock. The member carries two axially spaced portions bounded by wall surfaces generally parallel to the direction the member travels while being forced into the sheet stock. The leading portion normally cooperates with an underlying die member to punch the aperture while the following portion with a slightly larger cross section engages the material margining the aperture formed by the leading portion and forces material into the annular recess separating the leading and following portion. In the installed position the leading portion adjoins the far surface of the sheet stock and the following portion adjoins the surface through which the member entered to provide axially spaced surfaces in intimate contact with material of the sheet stock and afford high resistance to bending moments applied to the member. When the primary consideration is the bending moments to which the stud is to be subjected, the leading and following portions are designed with a smaller diameter then the body of the stud to provide a radial surface at the juncture between body and following portion to afford maximum resistance to bending moments. When the principal force to be resisted is the axial pullout force the following portion is the full diameter of the stud body to effect a maximum interference surface between stud and workpiece.

The stud must possess a hardness equal to or greater than that of the workpiece to which it is to be attached. In practice it has been found that it is not important to have a large difference in the relative hardness of stud and sheet member.

The material forced into the axial recess intermediate the leading and following portions provides a high resistance to pullout forces applied to the member. Normally, the following portion displaces a volume of material slightly in excess of the volume of the annular recess. Where the member is being attached to a relatively soft ductile material, such as aluminum, the oversize following portion upsets and cold flows material into the intermediate annular recess. When used with harder, less ductile materials such as more commonly used steels, the following oversize portion has a broaching action that shears and peels back material encountered into the intermediate annular recess. When securing a member to a workpiece of very low ductility such as die cast material, it is usual to utilize a prepared recess substantially frustoconical in form which permits the leading portion to broach material from the workpiece after entering the opening while the following portion broaches material from the workpiece beginning at the workpiece surface. The contour of the intermediate groove, as shown with the sheet stock in radial section, taper inwardly from the leading cylindrical portion in the form of a frustoconical surface which is joined to the generally radial surface adjacent the following portion by a surface having a small radius of curvature.

It is an object of the present invention to provide a means for securing member to sheet material that requires a minimum number of operations and limits the likelihood that either member or sheet material will be deformed. It is further an object to provide a securing means that requires a minimum of tools and equals or exceeds previously used securing techniques in resisting axial and bending forces. These and other objects, features, and advantages of the invention will be apparent from the following more particular description of preferred embodiments of the invention.

BRIEF DESCRIPTION OF THE DRAWINGS

FIG. 1 is an isometric view of a stud and aligned workpiece for practicing the present invention; FIG. 1a is an isometric view of the stud of FIG. 1 with the axis in an inclined orientation; FIGS. 2a, 2b and 2c show the stud and workpiece of FIG. 1 with a cooperating die partly in section in a sequence of positions encountered during the securing of the stud to the sheet stock workpiece.

DETAILED DESCRIPTION

Figures 3A, 3B:
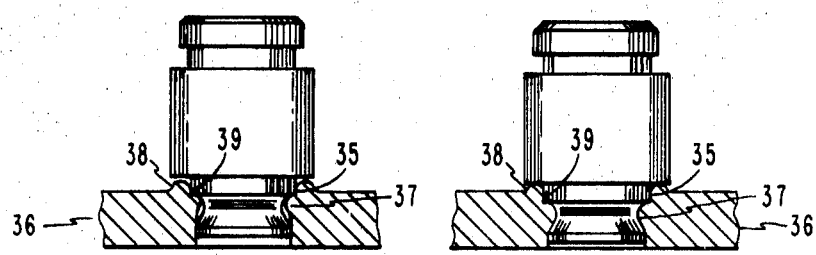
FIGS. 3a and 3b show a modified stud and sheet stock at positions of partial and completed securement.

Referring to the drawings, FIG. 1 shows a self-punching and clinching stud 10 aligned above the workpiece 11 which has resilient qualities and is capable of cold flow with the area to be engaged by the punch indicated by a dotted circle 13. The stud has a leading face surface 15 bounded by a cylindrical surface 16 with the intersection of these surfaces defining a shear or cutting edge 17. The second cylindrical surface 18 having a diameter slightly larger than the cylindrical surface 16 is axially separated from cylindrical surface 16 by an annular recess 20. A second annular 22 recess axially separates the second cylindrical surface 18 from the body of the stud. FIGS. 2a—2c show the stud being assembled to the workpiece in a single operation. As shown in FIG. 2a stud 10 is axially aligned with a cooperating opening 26 in die-plate 27 with the workpiece 11 to which the stud is to be secured therebetween. As a pressure pad 29, which forms a portion of the die-set, is lowered engaging the upper surface 30 of the stud 10, the bottom surface 15 of stud 10 cooperates with 27 to shear a blank of material from the workpiece as it is advanced toward the die-aperture. The pressure pad projection 30 which engages stud 10 has a diameter not exceeding the minimum diameter of the stud body portion. When the stud, acting as a punch, has progressed about half the distance through the workpiece, the blank in advance of the stud surface is parted from the remainder of the workpiece and is thereafter driven through aperture.

As the stud shank portion, bounded by cylindrical surface 16 enters the workpiece aperture generated by the punching action of the leading face 15, the marginal portion of the stud bounded by the cylindrical surface 18, which exceeds the diameter of the leading face, upsets workpiece material into the annular recess. At normal rates of advance of the member with respect to the workpiece, more ductile materials such as aluminum will cold flow into the annular recess 37, while less ductile materials such as stainless steel will be broached into the recess in the form of a shaving. As is well recognized, the slower the rate of entry, the greater the propensity of a given material to cold flow. As stud attains the final position shown at FIG. 2c the workpiece material has been upset into closely constricting relation about the cylindrical surfaces 16 and 18 and the radial surface 31 at the end of the principal diameter of the stud body has been pressed into intimate interfacial contact with the surface 32 of workpiece 11. This is facilitated by the annular groove 22.

In FIGS. 3a and 3b a stud is shown which does not have an annular groove axially intermediate body 34 and shank portion 35. As the enlarged shank portion 35 is forced into the workpiece 36, not only is material forced into the annular groove 37, but a ridge 38 of sheet stock material is also formed. If this ridge 38 of workpiece material is not otherwise accommodated, it will engage the radial surface 39 in the final assembled condition leaving the marginal portion of the stud radial surface 39 out of engagement with the workpiece as shown at 3b. Since the surface having a maximum diameter is the most effective surface area with respect to the resistance to bending moments exerted on the assembled stud, such a resulting assembly is unacceptable. By providing the annular groove or recess 22, as shown in FIG. 2c, the ridge of workpiece material upset normal to the workpiece surface can be driven back as material is accommodated in groove 22 to cause the radial surface to be in continuous contact with the workpiece. Use of the groove or undercut 22 not only improves the strength when resisting bending forces but also makes it easier to maintain accurate dimensions and aids in assuring that the stud is assembled to the workpiece in a properly perpendicular orientation.

Figure 4:
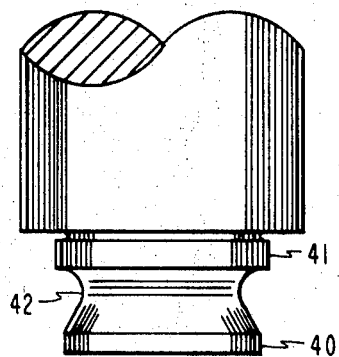
FIG. 4 is an enlarged side elevation of the end portion of the stud of FIG. 1.
Figure 5:
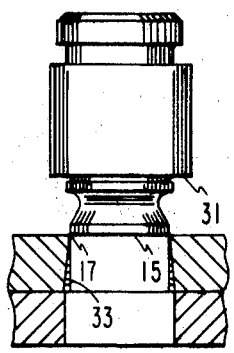
FIG. 5 shows the stud of FIG. 4 at a location of initial contact with a cooperating die and workpiece.

A typical stud design is shown in FIG. 4 wherein the annular recess between cylindrical surfaces 40 and 41 is formed by frustoconical surface 42 extending from the leading portion cylindrical surface 40 and inclined towards the stud axis at approximately a 35° angle. The frustoconical surface terminates in a surface which curves to join the cylindrical surface 41 with a radius sufficiently large to avoid inducing stress concentrations at this axial location. The volume of the cylindrical portion defined by the surface 41 that exceeds the radius of the cylindrical surface 40 is related to the volume of the annular recess within the radius of surface 40 in a relation of 1.04 to 1 when normal die design practices are observed, that is, when the die opening has a diameter 4 percent greater than the diameter of punch leading face 15. When this clearance is increased the volume ratio above is increased. This relationship results from the fact that as seen at FIG. 5 the punching action causes a shearing of the sheet stock material extending generally along the approximately frustoconical surface extending from the shear edge 17 of the punch to the shear edge of the die causing removal of a volume of material within the sheet stock slightly greater than the volume defined by the progress of the shear edge through the sheet stock by an amount equal to the volume of rotation of the shaded area 33.

Figure 6:
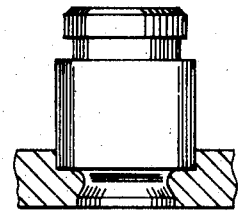
FIG. 6 shows a stud of an alternative design assembled to a sheet stock portion.

The design with a radial shoulder surface as shown in FIGS. 1 through 5 is utilized when the stud connection is required to withstand bending forces as contact between the sheet stock 11 and the shoulder radial surface 31 increases the resistance to bending loads. When the resistance to pullout forces is paramount the configuration of FIG. 6, without the radial shoulder is utilized as this maximizes the resistance to axial forces for a given diameter stud.

Figure 7:
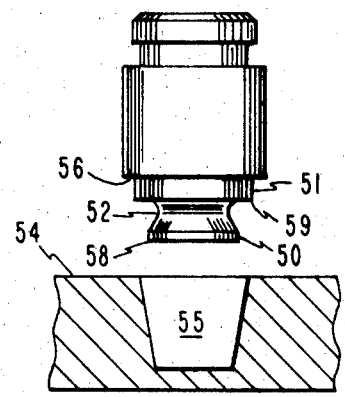
FIGS. 7 and 8 show a second alternative stud structure for practicing the instant invention.
Figure 8:
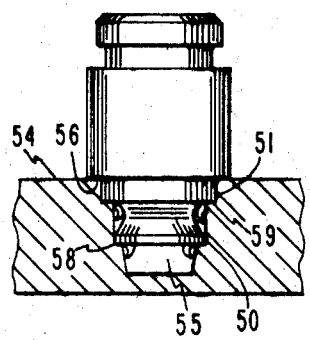

When it is desired to secure stud or other device to a hard, substantially nonflowable material having very low ductility such as die-castings, the method of FIGS. 7 and 8 can be utilized. Here a stud has first and second cylindrical portions 50, 51 are likewise axially separated by an annular recess 52. The hard material workpiece 54 to which it is desired to attach the stud is provided with a frustoconical depression 55 having an exit opening of slightly smaller diameter than the diameter of the second cylindrical portion 51 which adjoins the stud body portion. The diameter of the first cylindrical portion is related to the frustoconical opening to cause the diameter of the trailing cylindrical edge of the first cylindrical portion 50 to exceed that of the recess in the assembled condition. The stud is forced axially into the frustoconical depression until the radial surface 56 abuts the workpiece surface. As the projecting end of the stud is pressed into the opening, the leading or shear edges 58 and 59 respectively of the cylindrical portions 50, 51 cause a broaching action to occur with respect to the interferring workpiece materials. The material broached by the leading cylindrical portion is accumulated in the extended depth of the depression disposed beyond the maximum penetration of the stud and the material broached from the workpiece by the cylindrical portion is turned into the annular recess 52. Accordingly, the pullout of the stud is resisted by both the frictional engagement of the cylindrical surfaces 50 and 51 with the workpiece material and the broached material that projects into the annular groove 52.

Figure 9:
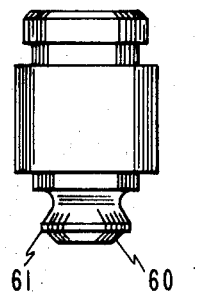
FIG. 9 illustrates a modified form of the stud of FIGS. 8 and 9.

Assembling the stud to hard material can occasionally be assisted with respect to initial alignment by utilizing a tapered lead element 60 as shown in FIG. 9 which, however, as its base joins the leading surface of the cylindrical portion radially inward of the shear edge 61 to preclude interference with the broaching action during assembly.

I claim:

1. A method of securing a self-piercing and clinching member to a sheet of metal comprising:

positioning at one side of said sheet a self-piercing and clinching member formed of harder material than said sheet and having a shank formed with a leading face, a cutting edge along the margin of said leading face, a first generally cylindrical surface extending axially from said cutting edge, a second cylindrical surface projecting radially outward and axially spaced from said first cylindrical surface and a radially inwardly projecting annular recess axially intermediate said first and second generally cylindrical surfaces;

positioning at the opposite side of said sheet a supporting surface having a relieved portion margined by a cooperating shearing edge aligned with said shank; and forcing said member against such sheet causing said cutting edge to shear a blank from said sheet and thereafter causing said second cylindrical portion to force material from said sheet into said annular recess and into confining surrounding relation with respect to said first cylindrical surface.

2. The method of claim 1 wherein said member presents a radial shoulder adjoining said shank and said shank portion includes a second annular recess axially intermediate said second generally cylindrical surface and said radial shoulder and wherein said member is forced into said sheet to bring said radial shoulder into abutting, substantially coplanar relation with said one side of said sheet.

3. The method of claim 2 wherein the axial distance from said radial shoulder adjoining said shank to said first generally cylindrical surface is less than the thickness of said sheet.